United States Patent [19]

Chevrolat et al.

[11] 4,138,286
[45] Feb. 6, 1979

[54] METHOD OF FORMING A PART OF REVOLUTION HAVING A FLAT SHAPE

[75] Inventors: Gilbert A. Chevrolat, Soisy sous Montmorency; Alain Houyvet, Clamart, both of France

[73] Assignee: Commissariat a l'Energie Atomique, Paris, France

[21] Appl. No.: 818,561

[22] Filed: Jul. 25, 1977

[30] Foreign Application Priority Data

Jul. 27, 1976 [FR] France .................................. 76 22841

[51] Int. Cl.² .......................... F16F 15/30; B65H 81/00
[52] U.S. Cl. ...................................... 156/172; 74/572; 156/245; 264/258; 428/357
[58] Field of Search ............... 156/172, 173, 175, 169, 156/425, 426, 245, 242; 74/572-574; 310/74; 79/159, 159.1; 428/65, 357; 42/107 MM; 188/251 R, 251 A; 264/258, 257

[56] References Cited

U.S. PATENT DOCUMENTS

| Re. 27,973 | 4/1974 | Pennington et al. .................. 156/172 |
|---|---|---|
| 2,953,418 | 9/1960 | Runton et al. ......................... 308/238 |
| 3,296,886 | 1/1967 | Reinhart, Jr. ........................... 74/572 |
| 3,602,067 | 8/1971 | Wetherbee, Jr. ....................... 74/572 |
| 3,607,510 | 9/1971 | Serafino et al. ...................... 156/172 |
| 3,683,216 | 8/1972 | Post ........................................ 310/74 |
| 3,743,069 | 7/1973 | Barnett et al. ........................ 156/173 |
| 3,884,093 | 5/1975 | Rabenhorst ............................. 74/572 |
| 3,966,523 | 6/1976 | Jakobsen et al. ..................... 156/173 |
| 4,020,714 | 5/1977 | Rabenhorst ............................. 74/573 |

FOREIGN PATENT DOCUMENTS

| 1233103 | 8/1968 | United Kingdom. | |
|---|---|---|---|
| 431343 | 11/1974 | U.S.S.R. ................................... 74/572 |
| 440514 | 2/1975 | U.S.S.R. ................................... 74/572 |

Primary Examiner—Michael W. Ball

[57] ABSTRACT

A continuous filament impregnated with a hardenable polymer is wound on a mandrel between two detachable sideplates of a mold so as to form a part of revolution having a longitudinal dimension in a direction parallel to the axis of revolution which is of small value compared with its radial dimension, the proportion of polymer being substantially constant from the vicinity of the mandrel to the periphery of the part.

2 Claims, 6 Drawing Figures

METHOD OF FORMING A PART OF REVOLUTION HAVING A FLAT SHAPE

This invention relates to a part of revolution which has a flat shape, that is to say a longitudinal dimension in a direction parallel to the axis of revolution which is of small value compared with its radial dimension, said part being obtained by winding on a mandrel between two side-plates a continuous filament impregnated with a hardenable polymer.

The invention is also concerned with a method and a device for the manufacture of a part of this type.

It is a known practice to adopt the method of winding of a continuous filament of glass or another substance such as carbon, the filament having been previously subjected to impregnation with a hardenable polymer and to agglomeration by baking. This method is employed for the purpose of forming parts of various types such as tubes or cylinders which have a small radial dimension with respect to their internal diameter and to their longitudinal dimension such as, for example, a radial thickness of a few units per cent of their internal diameter. It is not possible by means of this method, however, to obtain parts having the same composite nature such as a filament impregnated with synthetic resin when the radial dimension of the part is of substantial value with respect to its longitudinal dimension. This is the case, for example, with discs which have a central hole, conical rings or annular members which are uniform and do not exhibit any internal deformations or in other words exhibit maximum uniformity of mechanical strength around their entire periphery.

In the case of a number of different factors and in particular the shrinkage which the synthetic binding resin undergoes at the stage of polymerization as well as the difference in shrinkage after expansion under the action of the heat treatment between the organic resin and the filament material which is usually of a mineral type, no major problem arises in the case of a thin composite structure. In the case of parts having a large transverse dimension, however, such factors become of key importance by reason of their cumulative effects. This results in the final part in the presence of zones having high stresses and internal deformations, the presence of which is not revealed by the external appearance of the part in the majority of cases. These tensile stresses and primarily these internal deformations are particularly harmful when the parts are intended to be incorporated in a unit which rotates at high velocity and in which there is a particularly substantial danger of premature failures.

The parts in accordance with the invention are not subject to the disadvantage mentioned in the foregoing and can therefore be employed in a unit which rotates at high speed corresponding to peripheral velocities which can exceed 400 m/s. By reason of the fact that there are no residual stresses, there does not appear during rotation any defect in surface planarity which would be liable to affect the balance or any dissociation of filaments under the action of centrifugal force.

A distinctive feature of the parts mentioned above lies in the fact that their impregnation polymer content remains substantially constant from the vicinity of the mandrel to their periphery.

In addition, the parts preferably have at least one of the following distinctive features:

the impregnation polymer receives an addition of an agent for gelation or hardening acceleration which is sufficiently rapid to ensure that gelation or hardening of the polymer is sufficiently far advanced at the end of the winding operation to ensure that the polymer is not liable to flow within the part during the hardening operation.

The parts are obtained by winding at least two filaments having different moduli of elasticity on the mandrel so that the filament which has the lowest modulus of elasticity is in the portion located nearest the mandrel and the filament which has the highest modulus of elasticity is in the peripheral portion.

The method of manufacture of the aforementioned parts in accordance with the invention is distinguished by the fact that the part is subjected during polymerization to a powerful compacting action which is sufficient to prevent migrations of the impregnation polymer within the part until the hardening process has been completed.

The method preferably includes in addition at least one of the following distinctive features:

the compacting operation is carried out at least partially by means of an element which is wound on the periphery of the part after winding of the filament.

The compacting operation is carried out at least partially by insertion within a metallic component.

The compacting element which is wound on the periphery of the part or the metallic insertion component also serves to seal the production mold.

Winding of the filament is carried out under a constant or slightly decreasing tension from the central zone to the periphery.

The device for securing these parts in accordance with the invention is intended to overcome a difficulty which arises when it is desired to fix said parts on a metallic shaft in order to subject these latter to a high speed of rotation. It is then necessary in practice to secure the part within a metallic ring which is rigidly fixed to the shaft. However, said metallic ring forms an internal portion of the part around the shaft and rotates at a peripheral velocity which is considerably lower than in the peripheral portion of the part of material in filament form which is impregnated with hardened polymer. In consequence, the filament part which is wound and impregnated with synthetic resin is subjected to stresses which tend to separate said part from the ring. By reason of the different moduli of elasticity of the two materials, namely the metal of the ring and the composite synthetic resin filament, this difference produces a tendency towards separation of the two materials.

The device for fixing on a rotating shaft which also forms part of the invention comprises a mold constituted by two detachable side-plates and a rigid ring secured to the shaft and provided with a groove which constitutes the bottom of the mold. The device preferably offers in addition at least one of the following distinctive features:

the groove of the ring has two walls in planes at right angles to the axis of the shaft.

the bottom of the groove of the ring has the shape of a polygon and the radius of the circle which is circumscribed about the polygon is of sufficient length with respect to the radius of the circle which is inscribed within the polygon to ensure that the shortest distance between the axis of the shaft and a turn which is applied within the bottom of the groove remains of smaller value in spite of the expansion of the turn under the action of the maximum centrifugal force to which it is subjected during operation.

The filament is wound under a sufficiently low tension to ensure that the turns are of circular shape around the periphery of the part.

The parts in accordance with the invention can attain or exceed a radial dimension of 100 mm which can be 200 times greater than their longitudinal dimension or even in excess of this value and are substantially free from internal deformations or tensile stresses.

There will now be described by way of example parts of composite structure and constituted by a glass filament impregnated with a synthetic resin and a device for fixing a part of this type on a rotating metallic shaft, reference being made to the accompanying drawings, wherein.

Figure 1:
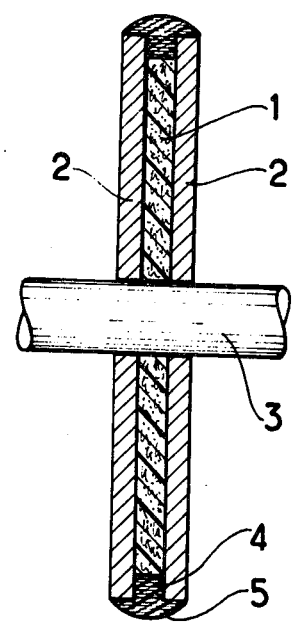
FIG. 1 illustrates a flat annular member.

The flat annular member shown in FIG. 1 has the following dimensions:

| Internal diameter | 30 mm |
|---|---|
| External diameter | 280 mm |
| Longitudinal dimension | 2 mm |
| Radial dimension ($\frac{280 - 30}{2}$) | 125 mm |
| Ratio of $\frac{\text{radial dimension}}{\text{longitudinal dimension}}$ | 62.5 |

The mold is constituted by two rigid side-plates 2 of metal (or any other suitable material), the diameter of which exceeds that of the annular member to be manufactured by 3 mm, said side-plates being fixed on an axial mandrel 3. The filament material is a continuous thread of silica glass modified by manganese or aluminum oxides of the grade designated commercially as "R" or "S", said thread being wound around the axis under a constant tension of 1 Kg.

The impregnating resin is an epoxy resin sold commercially by the Shell Company under the trade name "Epon 828" with an addition of diaminodiphenylmethane which serves as a hot-state hardener. The thread is wound between the two side-plates while being continuously impregnated with the mixture of epoxy resin and hardener, the temperature of the mold as well as the temperature of the wound thread being maintained between 45° and 65° C. in order to ensure optimum fluidity followed by rapid gelation.

The thread is cut when the desired diameter has been attained at the end of the winding operation. In the portion which still remains free between the two side-plates, there are wound onto the yarn at least four turns of the elasto-plastic tape 4 of polychlorofluoroethylene which is sold under the trade name "Tedlar". Said tape has a width of 15 mm and is folded in two (which represents eight thickness of tape). Since the hollow space between the side-plates is thus substantially filled without cutting the compacting or binding tape, said tape is unfolded to its normal width in order to complete the binding operation with three turns of tape 5 of normal width which project beyond the metallic side-plates, with the result that the mold is thus hermetically sealed.

Baking is carried out in the mold for a period of three hours within an oven at 160° C., the mold being fixed on a rotating spindle.

Figure 2:
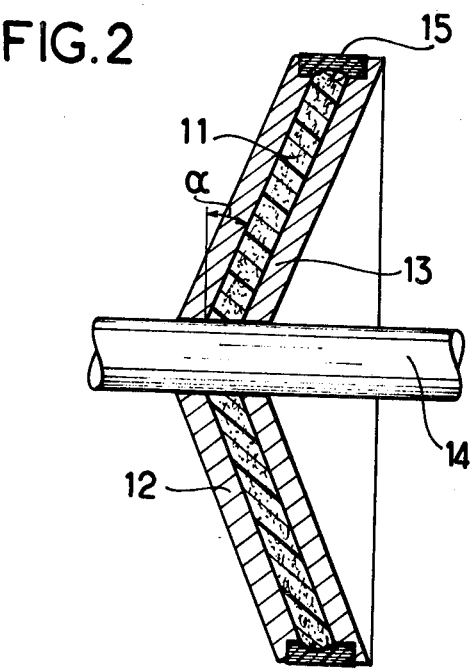
FIG. 2 illustrates a conical annular member.

The conical annular member 11 which is illustrated in FIG. 2 has the following dimensions:

| Internal diameter | 60 mm |
|---|---|
| External diameter | 280 mm |
| Conicity: angle with a plane at right angles to the axis 11° (tg α = 0.1944) | |
| Longitudinal dimension | 3 mm |
| Radial dimension ($\frac{280 - 60}{2}$) | 110 mm |
| Ratio of $\frac{\text{radial dimension}}{\text{longitudinal dimension}}$ | 36 |

In order to manufacture a flat part or parts of this type which have a very high ratio between their longitudinal dimension and the radial dimension of the composite material or in the case of very small longitudinal dimensions, it is preferable to complete the winding of the filament of glass, carbon and so forth by allowing this latter to spread out within a recess having a depth of a few millimeters and formed around the periphery of the mold. At the end of the operation, said recess is filled with the tape, the braided tape, the hoop or the device which it is desired to employ for the compacting operation. This recess can usefully be employed for the purpose of giving a special peripheral shape to the part which is being manufactured or on the contrary for the purpose of removing this excess quantity of material by machining.

The mold is formed of two sections 12 and 13 which are fixed on a mandrel 14 on each side of the part. The filament material is a continuous thread of glass of the grade sold under the commercial designations "R" or "S", said thread being wound under a constant tension of 2 Kg. The resin is the same as the type employed for the flat annular member of FIG. 1 and the manufacturing procedure is identical up to the end of the thread-winding operation.

Compacting is then carried out by means of a braided tape 15 of pre-impregnated carbon fibers which is inserted in the recess formed for this purpose in the periphery of the mold to a total depth of 3 to 4 mm.

Baking is carried out in an oven at 160° C. by introducing the part into the oven after preheating of this latter.

The method in accordance with the invention is applicable to all continuous industrial threads which can be wound, namely threads of glass having different compositions, of carbon, especially of graphite, of mineral fibers, organo-mineral or organic fibers. If filaments of different materials are employed for the same part, a preferable method consists first in winding the filament which has the lower modulus of elasticity and then the filament which has the higher modulus of elasticity. For example, in the case of glass filaments designated commercially as "R" and "E" (non-alkaline borosilicate glass), the "E" glass filament is wound first, followed by the filament "R". In the case of filaments of "R" glass and graphite, the "R" glass filament is wound first and then followed by the graphite filament.

Among the resins which are suitable for performing the function of binding agent in the composite structure, there can be employed a fluid epoxy resin with a catalyst which permits hardening in the hot state or at room temperature as well as a polymerization and gelation accelerator if necessary. By way of example, nadic methylanhydride (NMA) can be employed as hardener and the product which is known as DMP30 can be employed as accelerator. It is also possible to make use of the unsaturated polyester resins which react with a monomer, the silicone resins, these different resins being preferably without solvent, as well as the elastomers. In order to obtain a composite structure having optimum cohesion, it is usually preferred to carry out hardening by means of a heat treatment which ensures complete polymerization of the resin. Satisfactory results have also been obtained, however, by impregnating the filament with a rubber latex and baking at low temperature.

The use of pre-impregnated threads (that is to say threads which have previously been impregnated with dried but non-polymerized binder and which have sufficiently high storage stability to permit storage for a period of several days prior to winding) can be contemplated but does tend to produce less satisfactory results.

Figure 3:
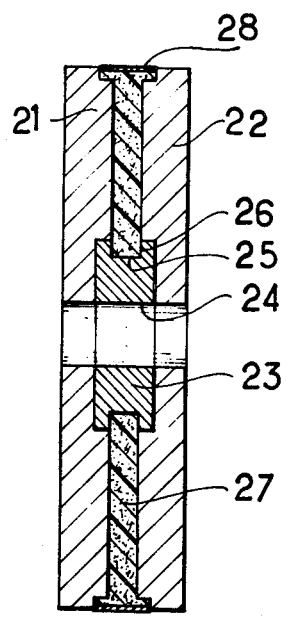
FIG. 3 illustrates in axial cross-section a mold filled with a composite filament material of glass and synthetic resin.
Figure 4:
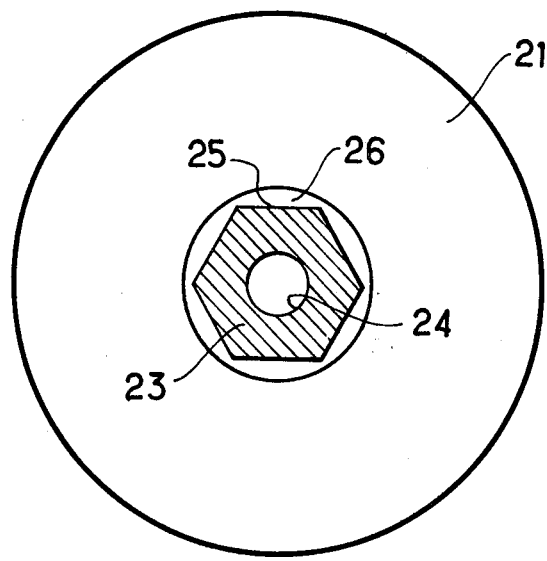
FIG. 4 is a view in elevation of one of the side-plates of the mold in which the ring is shown partly in cross-section.

In FIGS. 3 and 4, the mold has two side-plates 21 and 22 and a ring 23 which is subsequently intended to be mounted on the rotating shaft by means of its bore 24. The ring 23 is provided with a groove 25 having side walls 26 which are perpendiculr to its axis. The filament of glass impregnated with resin such as epoxy resin for example is wound at 25 up to the vicinity of the edges of the side-plates, then compacted by means of a binding tape 28 of flexible heat-resistant thermoplastic material.

Figure 5:
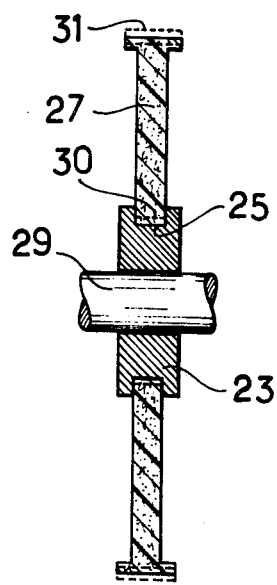
FIG. 5 illustrates the flat annular member which is mounted on the shaft, in the rest position and in the position during rotation.

When the glass filament has been completely wound and the binding tape 28 has been secured in position, the mold is transferred to an oven, then heated therein to a temperature and for a period of time which are sufficient to ensure complete hardening of the resin. The mold is then withdrawn from the oven, the side-plates are removed and the flat annular member shown in FIG. 5 is obtained, said member being then mounted on the shaft 29.

Figure 6:
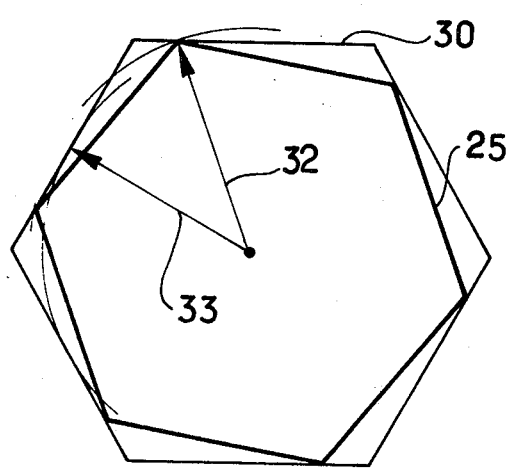
FIG. 6 illustrates to a larger scale the bottom of the groove of the ring and those turns of the annular member which are nearest the bottom of the groove during rotation.

When the shaft 29 is driven in rotation, the annular member 27 tends to move away from the ring under the action of centrifugal force, with the result that the turns of said annular member which are nearest the axis and the sealing tape take up respectively the positions shown in dashed lines at 30 and 31. The side walls 26 of the groove of the ring permit this detachment, thus preventing the appearance of stresses which would be liable to damage the flat annular member. But the polygonal structure of the ring groove (hexagonal in this instance) prevents the annular member from sliding with respect to the ring. A relative annular displacement takes place to a certain extent between the bottom of the groove of the ring and those turns of the annular member which are located nearest this latter. As shown in FIG. 6, however, the radius 32 of the circle which is circumscribed about the polygon of the bottom of the groove remains longer than the radius 33 of the circle which is inscribed within the innermost turns. The flat annular member therefore cannot slide with respect to the ring and rotates at the same velocity as the shaft.

Although the parts, the method and the device which have just been described in detail in the foregoing appear to be preferable, it will be apparent that different modifications can be made therein without consequently departing from the scope of the invention. For example, certain operations or certain components can be replaced by others which could perform the same technical function. In particular, the filament material, the impregnation resin and the agent for gelation or hardening acceleration can be different. The groove of the ring can form a polygon having a different number of sides such as, for example, a pentagon, a heptagon or an octagon.

The invention applies in general to the manufacture of all parts in which the transverse dimension is of greater value than the longitudinal dimension. The invention is more particularly suited to the manufacture of components for ultracentrifuges.

What we claim is:

1. A method of manufacture of a part of revolution having a longitudinal dimension in a direction parallel to the axis of revolution which is a small value compared with its radial dimension comprising the steps of winding a continuous filament on a mandrel between two detachable side-plates constituting a mold under a constant or slightly decreasing tension from the central zone to the periphery of said part, said side plates being attached to said mandrel by means of a rigid ring secured to the mandrel and provided with a groove which constitutes the bottom of the mold, said groove of the ring having two walls in planes at right angles to the axis of the ring and the bottom of the groove of the ring having the shape of a polygon, the radius of the circle which is circumscribed about the polygon being of sufficient lengths with respect to the radius of the circle which is inscribed within the polygon to ensure that the shortest distance between the axis of the ring and a turn which is applied within the bottom of the groove remains of smaller value in spite of the expansion of the turn under the action of the maximum centrifugal force to which it is subjected during operation, said method further comprising the steps of impregnating said filament with a hardenable polymer to which has been added an agent for gelation or hardening acceleration which is sufficiently far advanced at the end of the winding operation to ensure that the polymer is not liable to flow during the hardening operation, maintaining the proportion of impregnation polymer contained in said filament substantially constant from the vicinity of the mandrel to the periphery of said part during the winding operation and until the complete hardening of the impregnation polymer is obtained, thereafter subjecting the periphery of the part during the polymerization to a powerful compacting action which is sufficient to prevent migrations of the impregnation polymer within the part until the hardening process has been completed, and then baking the part, and finally withdrawing the part from the mold.

2. A method according to claim 1, wherein the filament is wound under a sufficiently low tension to ensure that the turns are of circular shape around the periphery of said part.

* * * * *